(12) United States Patent
Bischoff et al.

(10) Patent No.: US 6,238,619 B1
(45) Date of Patent: May 29, 2001

US006238619B1

(54) PROCESS FOR THE PRODUCTION OF AN ELECTRODE FOR A FUSED CARBONATE FUEL CELL

(75) Inventors: Manfred Bischoff, Feldkirchen; Bernd Rohland, Ulm; Uwe Jantsch, Freigericht, all of (DE)

(73) Assignee: MTU Motoren- und Turbinen-Union Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 09/117,685

(22) PCT Filed: Jan. 31, 1997

(86) PCT No.: PCT/EP97/00422

§ 371 Date: Jun. 15, 1999

§ 102(e) Date: Jun. 15, 1999

(87) PCT Pub. No.: WO97/28571

PCT Pub. Date: Aug. 7, 1997

(30) Foreign Application Priority Data

Feb. 3, 1996 (DE) .............................................. 196 03 918

(51) Int. Cl.[7] ...................................................... B22F 7/02
(52) U.S. Cl. ................................... 419/2; 419/5; 419/29; 419/45; 419/55
(58) Field of Search .............................. 419/2, 5, 29, 45, 419/55

(56) References Cited

U.S. PATENT DOCUMENTS

| | | | |
|---|---|---|---|
| 3,607,417 | * 9/1971 | McRae et al. | 136/86 |
| 5,582,624 | * 12/1996 | Jantsch et al. | 29/623.1 |
| 6,063,141 | * 5/2000 | Wendt et al. | 29/623.1 |

FOREIGN PATENT DOCUMENTS

| | | |
|---|---|---|
| 0 661 767 A1 | 7/1995 | (EP) . |
| 60-117566 | 6/1985 | (JP) . |
| WO 96/08050 | 3/1996 | (WO) . |

OTHER PUBLICATIONS

"Synthesis and Performance of $LiCoO_2$ Cathodes for the Molten Carbonate Fuel Cell" Carina Lagergren, Anders Lundblad, and Bill Bergman—J. Electrochem. Soc., vol. 141, No. 11, Nov. 1994.

* cited by examiner

Primary Examiner—Daniel Jenkins
(74) Attorney, Agent, or Firm—Evenson, McKeown, Edwards & Lenahan, P.L.L.C.

(57) ABSTRACT

The invention concerns a process for the production of a porous lithium cobaltite electrode plate with a large inner surface and low polarization resistance. Lithium carbonate powder and cobalt metal powder are uniformly mixed together and then films are produced from the mixture and plates from the films, which plates are sintered and then placed in an air stream for several hours at a temperature between 400° C. and 488° C. until the conversion of said plates to lithium cobaltite electrode plates with an extremely large inner surface has taken place.

19 Claims, No Drawings

PROCESS FOR THE PRODUCTION OF AN ELECTRODE FOR A FUSED CARBONATE FUEL CELL

BACKGROUND AND SUMMARY OF THE INVENTION

The invention relates to a process for producing an electrode for a fused carbonate fuel cell, an electrode made according to the process, and a fused carbonate fuel cell with an electrode produced according to this process.

The production of cathodes for carbonate melt fuel cells from lithium cobaltite ($LiCoO_2$) is known. For making such cathodes, lithium cobaltite powder is mixed with a binder. A dispersant can be added to the binder. A foil is made from the mixture which is divided into plates. The plates are sintered at high temperatures in an air-carbon dioxide atmosphere. Lithium cobaltite is made by reacting cobalt with lithium compounds (EP 0 473 236 A2).

Making lithium cobaltite by reacting cobalt oxide (iron oxide) with lithium hydroxide vapor as a powder in a high-temperature reaction is also known. This powder is made into brittle electrode plates with small dimensions by a ceramic sintering process (JP 0636, 770).

Finally, making a lithium cobaltite layer from a ductile cobalt layer whose pores are filled with lithium carbonate is known. Conversion to the lithium cobaltite layer is preferably done after combination with a matrix layer and an anode layer and after installation together with current collector plates in a cell holder of a fuel cell during the start-up phase of the fuel cell. The structure of the lithium cobaltite electrode plate made in this way corresponds to the structure of the original porous cobalt electrode plate which has a relatively high polarization resistance (DE 43 03 136 C1).

The invention is based on the problem of creating a process for producing a porous lithium cobaltite electrode plate with a large internal surface area and a low polarization resistance and producing an electrode plate made according to the process.

The problem is solved for the process according to the invention by mixing cobalt metal powder and lithium carbonate powder with each other homogeneously then producing foils from the mixture and plates from the foils. The plates are sintered into porous electrode precursor plates are then exposed electrode precursor plates to an air flow for several hours at a temperature of between 400° C. and 488° C., until the electrode precursor plates have been converted into lithium cobaltite electrode plates with extremely large internal surface areas. In the process according to the invention, a lithium cobaltite formation reaction that determines the structure takes several hours. Initially, cobalt in the porous cobalt/lithium carbonate precursor electrode plate is oxidized in the atmosphere of air. Then, lithium cobaltite and lithium oxide are formed at the points where cobalt oxide contacts lithium carbonate, releasing carbon dioxide which is carried away with the air current. Because of its high vapor pressure, lithium oxide changes to the gas phase in which it reacts with cobalt oxide that has not contacted lithium carbonate to form lithium cobaltite.

While the lithium cobalt is being formed, it is preferable to keep the temperature at 420° C. to 480° C. It has been shown that in this temperature range the above-described reactions take place under favorable conditions, influenced by atmospheric oxygen.

In particular, the quantity of air admitted and the air flowrate are adjusted such that the carbon dioxide level in the air is no higher than approximately 1% and the air is allowed to act for approximately 10 hours. Under these conditions, an electrode consisting of lithium cobaltite with a very large internal surface area of 2 to 6 m²/g is obtained, that no longer contains any lithium carbonate.

The reactions that take place in the above-described process during the various phases are described in detail below:

Mechanism of Solid-Gas Reaction (400° C.–488° C.)

Oxidation of cobalt:

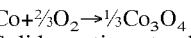
$Co + \tfrac{2}{3}O_2 \rightarrow \tfrac{1}{3}Co_3O_4$

Solid reaction at cobalt oxide/lithium carbonate contact points:

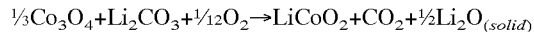
$\tfrac{1}{3}Co_3O_4 + Li_2CO_3 + \tfrac{1}{12}O_2 \rightarrow LiCoO_2 + CO_2 + \tfrac{1}{2}Li_2O_{(solid)}$

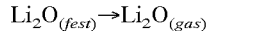
$Li_2O_{(fest)} \rightarrow Li_2O_{(gas)}$

Gas diffusion of $Li_2O_{(gas)}$:

$Li_2O_{(gas)}$ (reaction location 1)→diffusion→$Li_2O_{(gas)}$ (reaction location 2)

Gas-solid reaction at reaction location 2:

a) 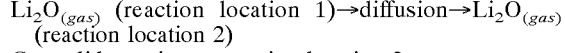
$\tfrac{1}{3}Co_3O_4 + Li_2O_{(gas)} + \tfrac{1}{12}O_2 \rightarrow LiCoO_2$ When the carbon dioxide component of the air is small, not exceeding a value of 1%, an electrode consisting of lithium cobaltite with a very large internal surface area of 2–6 m²/g is obtained, which no longer has any $Li_2CO_3$ after ten hours. The structure formed during this combined oxidation/activation process is retained when the electrode is used in a carbonate melt fuel cell.

$Li_2O$ diffusion into oxidized CO particles that have not contacted $Li_2CO_3$ particles is not hindered by increasing the $CO_2$ level of the air since $Li_2CO_3$ forms from the $Li_2O$ and $CO_2$ once again. Consequently the rate of $LiCoO_2$ formation decreases with a rising $CO_2$ level in the air and the desired fine structure with a large internal surface area cannot form.

When moist air is used with vapor levels of over 2%, the activation process for forming a larger internal surface area of over 2 m²/g can also be carried out with $CO_2$ levels of over 1% in the activation gas atmosphere. In this case, $LiCoO_2$ is formed by reacting oxidized cobalt with lithium hydroxide according to the following mechanism.

$LiCoO_2$ formation in the presence of water vapor:

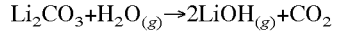
$Li_2CO_3 + H_2O_{(g)} \rightarrow 2LiOH_{(g)} + CO_2$

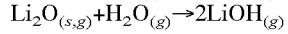
$Li_2O_{(s,g)} + H_2O_{(g)} \rightarrow 2LiOH_{(g)}$

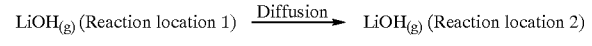
$LiOH_{(g)}$ (Reaction location 1) $\xrightarrow{\text{Diffusion}}$ $LiOH_{(g)}$ (Reaction location 2)

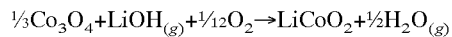
$\tfrac{1}{3}Co_3O_4 + LiOH_{(g)} + \tfrac{1}{12}O_2 \rightarrow LiCoO_2 + \tfrac{1}{2}H_2O_{(g)}$ When the vapor level is raised to over 2%, the reaction is not accelerated further.

The process according to the invention can be carried out after the electrode precursor plates have been placed in an oven under the conditions described above, removing the lithium cobaltite electrodes after the oven has cooled and assembling them with a matrix layer saturated with the molten electrolyte and an anode as well as with current collectors to form a fuel cell.

It is also favorable to combine the electrode precursor plate in question with a matrix layer filled with fused carbonate into a layer arrangement corresponding to the fuel cell and then to build it into a fuel cell together with the latter, and to carry out the process according to the invention after installation in the fuel cell. Under the conditions of the process according to the invention, the lithium cobaltite cathode is formed during a fuel cell start-up procedure. The lithium cobaltite can also be produced as a thin, adhesive layer on a porous nickel substrate, which thus becomes oxidized.

DETAILED DESCRIPTION OF PREFERRED EMBODIMENTS

The example below will further illustrate the invention

EMBODIMENT EXAMPLE

Fine cobalt powder with a particle size of less than $3\mu$ and $Li_2CO_3$ powder with a particle size of between $1\mu$ and $10\mu$, as starting components, are processed into a viscous slurry in a proportion of 66 wt. % CO and 34 wt. % $Li_2CO_3$ with addition of an organic binder dissolved in a nonaqueous solvent, a softener, and other organic additives. The slurry is cast into a foil by the tape casting process. Plates are made from the foil after the drying process and these plates are sintered in a protective gas oven at a temperature below the melting point of $Li_2CO_3$, preferably at 650° C., for 30 minutes in a reducing atmosphere. After this procedure the CO and $Li_2CO_3$ grains are in intimate contact in the electrode precursor plates. After the plates have been sintered, they are cooled at a rate of 200 K per hour to 460° C. and, after sufficient flushing with nitrogen, exposed to atmospheric air that is exchanged. At this temperature, complete oxidation of CO occurs within 10 hours and at the same time lithium cobaltite forms from the cobalt oxide and the $Li_2CO_3$ formed in a solid and gas reaction. The lithium cobaltite electrode thus formed has an extremely large internal surface area, depending on the rate of formation, which is retained after it has been installed in a fused carbonate fuel cell and the latter has been operated. The rate of activation is determined by (i) the carbon dioxide and vapor content and (ii) the cobalt and $Li_2CO_3$ powder particle size.

An electrode made by the process according to the invention has a structure that is typical of the process with an extremely large internal surface area. Because of this, such a cathode has a very low polarization resistance in a fuel cell and this increases its performance.

What is claimed is:

1. A process for producing an electrode for a fused carbonate fuel cell in which foils containing cobalt metal powder are made, and plates are made from the foils and sintered into electrode precursor plates, and wherein the electrode precursor plates are converted by cobalt oxidation and lithium cobaltite formation into lithium cobaltite electrode plates, the process comprising the steps of:
    mixing cobalt metal powder and lithium carbonate powder with each other into a mixture;
    making foils from the mixture;
    making plates from the foils;
    sintering the plates into electrode precursor plates;
    subsequently exposing the electrode precursor plates to an air flow at a temperature of 400° C. to 488° C. until the electrode precursor plates have been converted into lithium cobaltite electrode plates with extremely large internal surface areas.

2. The process according to claim 1, wherein the temperature is between 420° C. and 480° C.

3. The process according to claim 1, wherein a carbon dioxide level of air in the air flow is less than 1%.

4. The process according to claim 2, wherein a carbon dioxide level of air in the air flow is less than 1%.

5. The process according to claim 1, wherein a carbon dioxide level of air in the air flow is greater than 1% and the air has a vapor content of over 2%.

6. The process according to claim 2, wherein a carbon dioxide level of air in the air flow is greater than 1% and the air has a vapor content of over 2%.

7. The process according to claim 1, further comprising the steps of:
    depositing the electrode precursor plates in thin layers on a porous nickel substrate; and
    producing the lithium cobaltite electrode plates as adhesive layers on a nickel oxide substrate formed when the lithium cobaltite forms from the nickel in the porous nickel substrate.

8. The process according to claim 2, further comprising the steps of:
    depositing the electrode precursor plates in thin layers on a porous nickel substrate; and
    producing the lithium cobaltite electrode plates as adhesive layers on a nickel oxide substrate formed when the lithium cobaltite forms from the nickel in the porous nickel substrate.

9. The process according to claim 3, further comprising the steps of:
    depositing the electrode precursor plates in thin layers on a porous nickel substrate; and
    producing the lithium cobaltite electrode plates as adhesive layers on a nickel oxide substrate formed when the lithium cobaltite forms from the nickel in the porous nickel substrate.

10. The process according to claim 5, further comprising the steps of:
    depositing the electrode precursor plates in thin layers on a porous nickel substrate; and
    producing the lithium cobaltite electrode as adhesive layers on a nickel oxide substrate formed when the lithium cobaltite forms from the nickel in the porous nickel substrate.

11. The process according to claim 1, wherein the electrode precursor plates are exposed to cobalt oxidation and lithium cobaltite formation in an oven, and each of the lithium cobaltite electrode plates is combined after cooling with a matrix layer filled with a fused carbonate and an anode layer into a layer arrangement corresponding to the fuel cell.

12. The process according to claim 2, wherein the electrode precursor plates are exposed to cobalt oxidation and lithium cobaltite formation in an oven, and each of the lithium cobaltite electrode plates is combined after cooling with a matrix layer filled with a fused carbonate and an anode layer into a layer arrangement corresponding to the fuel cell.

13. The process according to claim 3, wherein the electrode precursor plates are exposed to cobalt oxidation and lithium cobaltite formation in an oven, and each of the lithium cobaltite electrode plates is combined after cooling with a matrix layer filled with a fused carbonate and an anode layer into a layer arrangement corresponding to the fuel cell.

14. The process according to claim 5, wherein the electrode precursor plates are exposed to cobalt oxidation and lithium cobaltite formation in an oven, and each of the lithium cobaltite electrode plates is combined after cooling with a matrix layer filled with a fused carbonate and an anode layer into a layer arrangement corresponding to the fuel cell.

15. The process according to claim 7, wherein the electrode precursor plates are exposed to cobalt oxidation and lithium cobaltite formation in an oven, and each of the lithium cobaltite electrode plates is combined after cooling with a matrix layer filled with a fused carbonate and an anode layer into a layer arrangement corresponding to the fuel cell.

16. The process according to claim 1, further comprising the steps of:
- combining each of the electrode precursor plates with a matrix layer filled with a fused carbonate and an anode layer into a layer arrangement which is placed in a fuel cell; and
- producing the lithium cobaltite cathode plate in the fuel cell in a start-up phase at below the melting point of the $LiKCO_3$ molten electrodes in the fuel cells.

17. The process according to claim 2, further comprising the steps of:
- combining each of the electrode precursor plates with a matrix layer filled with a fused carbonate and an anode layer into a layer arrangement which is placed in a fuel cell; and
- producing the lithium cobaltite cathode plate in the fuel cell in a start-up phase at below the melting point of the $LiKCO_3$ molten electrodes in the fuel cells.

18. The process according to claim 3, further comprising the steps of:
- combining each of the electrode precursor plates with a matrix layer filled with a fused carbonate and an anode layer into a layer arrangement which is placed in a fuel cell; and
- producing the lithium cobaltite cathode plate in the fuel cell in a start-up phase at below the melting point of the $LiKCO_3$ molten electrodes in the fuel cells.

19. The process according to claim 5, further comprising the steps of:
- combining each of the electrode precursor plates with a matrix layer filled with a fused carbonate and an anode layer into a layer arrangement which is placed in a fuel cell; and
- producing the lithium cobaltite cathode plate in the fuel cell in a start-up phase at below the melting point of the $LiKCO_3$ molten electrodes in the fuel cells.

* * * * *